United States Patent Office 3,284,485
Patented Nov. 8, 1966

3,284,485
ORGANOPOLYSILOXANES CURED WITH
ORGANOSILYL TRIS-CARBAMATES
John C. Goossens, Scotia, N.Y., assignor to General
Electric Company, a corporation of New York
No Drawing. Filed Dec. 20, 1963, Ser. No. 332,297
3 Claims. (Cl. 260—46.5)

This application relates to organopolysiloxanes capable of curing to the solid, elastic state.

Room temperature curing or room temperature vulcanizing organopolysiloxanes which cure to the silicone rubber state at room temperature upon exposure to the normal moisture present in the atmosphere are becoming known in the art. For example, in French Patent 1,198,749, there are described compositions prepared by adding an organoacyloxysilane, such as methyltriacetoxysilane, to a silanol chain-stopped polydiorganosiloxane. While the materials of the aforementioned French patent are eminently suitable for a number of applications, the compositions suffer several disadvantages. First, it is found that upon the addition of the organotriacyloxysilane to the silanol chain-stopped polydiorganosiloxane, there is a substantial evolution of acetic acid. While this acetic acid generated can be handled in the industrial environments in which such materials are prepared, the equipment and process time required to cope with this evolved acetic acid represents an economic disadvantage. Furthermore, it is found that the room temperature curing organopolysiloxanes resulting from mixing methyltriacetoxysilane with the silanol chain-stopped fluids often do not adhere as well as desired to surfaces upon which they are cured. For example, when one of the aforementioned compositions is allowed to cure in contact with an aluminum surface, it is possible to strip the cured material cleanly from the aluminum surface. A still further disadvantage of the compositions of the type described in the aforementioned patent is that acetic acid liberated during the curing process tends to cause corrosion of certain parts in contact with or adjacent to the curing material.

The present invention is based on my discovery of an improved room temperature vulcanizing silicone rubber which is free of the aforementioned deficiencies. The room temperature vulcanizable compositions of the present invention comprise a liquid silanol chain-stopped polydiorganosiloxane and an organosilyl tris-carbamate, which compositions are prepared by merely mixing the organosilyl tris-carbamate with the silanol chain-stopped polydiorganosiloxane fluid. Upon mixing the two components, the mixture begins to cure without the evolution of acidic by-products. The cured product is a silicone rubber which adheres tenaciously to various substrates, including aluminum surfaces after curing.

The organosilyl tris-carbamates employed in the practice of my invention have the formula:

(1) 

where R is a member selected from the class consisting of monovalent hydrocarbon radicals, halogenated monovalent hydrocarbon radicals and cyanoalkyl radicals, and R′ is a member selected from the class consisting of hydrogen and lower alkyl radicals, i.e., alkyl radicals containing from 1 to 8 carbon atoms, and R″ is a lower alkyl radical. Included within the scope of Formula 1 are organosilyl tris-carbamates in which the three silicon-bonded carbamate groups are different from each other.

Illustrative of the radicals represented by R in Formula 1 are, for example, alkyl radicals, e.g., methyl, ethyl, propyl, butyl, octyl, octadecyl, etc. radicals; aryl radicals, e.g., phenyl, naphthyl, tolyl, xylyl, etc. radicals; aralkyl radicals, e.g., benzyl phenylethyl, etc. radicals; alkenyl radicals, e.g., vinyl, allyl, etc. radicals; cycloaliphatic radicals, e.g., cyclohexyl, cycloheptyl, cyclohexenyl, etc. radicals; halogenated radicals, e.g., chloromethyl, dibromophenyl, trifluoromethylphenyl, trifluoromethylpropyl, etc. radicals; and cyanoalkyl radicals, such as cyanomethyl, beta-cyanoethyl, beta-cyanopropyl, gamma-cyanopropyl, omega-cyanobutyl, etc. radicals.

The organosilyl tris-carbamates of Formula 1 are prepared by reacting an organotrichlorosilane with an amine to produce an organotriaminosilane, all according to the following formula:

(2) 

where R, R′ and R″ are as previously defined. The organotriaminosilane is converted to the organosilyl tris-carbamate by reaction of the amino compound with carbon dioxide. The organotriaminosilanes employed as intermediates for the preparation of the organosilyl tris-carbamates are known in the art and details of their preparation need not be described here. While the specific organosilyl tris-carbamates employed in the practice of the present invention are not generally known in the art, certain analogous compounds are described by H. Breederveld, Rec. Trav. Chim., 81, 276 (1962). The specific material there described is the monocarbamate prepared from trimethyldiethylaminosilane. Organosilyl tris-carbamates having three different silicon-bonded carbamate groups are prepared from aminosilanes having three different amine groups attached to silicon. For example, a suitable tris-carbamate can be prepared by reacting methyltrichlorosilane successively with 2 moles each of di-n-propylamine, n-propylamine and n-butylamine to produce the mixed amine which is then reacted with carbon dioxide to produce the mixed tris-carbamate.

The organosilyl tris-carbamates employed in the practice of the present invention are generally solid materials which vary from crystalline materials to waxy solids, depending upon the particular groups represented by R, R′ and R″ and depending upon whether the three silicon-bonded carbamate groups are the same or different.

The liquid silanol chain-stopped polydiorganosiloxanes which are employed in the practice of the present invention have the formula:

(3) 

where Y is a member selected from the class consisting of monovalent hydrocarbon radicals, halogenated monovalent hydrocarbon radicals and cyanoalkyl radicals, and $n$ has a value of at least 10, e.g., from about 10 to 10,000 or more.

Illustrative of the radicals represented by Y of Formula 3 are alkyl radicals, e.g., methyl, ethyl, propyl, butyl, octyl, octadecyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloaliphatic radicals, e.g., cyclohexyl, cycloheptyl, cyclohexenyl, etc. radicals; halogenated radicals, such as monovalent hydrocarbon radicals containing carbon-bonded halogen, e.g., chloromethyl, chlorophenyl, dibromophenyl, trifluoromethylpropyl, trifluoromethylphenyl, dibromophenyl, bromohexyl, bromocyclohexenyl, etc. radicals; cyanoalkyl radicals, e.g., cyanomethyl, beta-cyanoethyl, beta-cyanopropyl, gamma-cyanopropyl, omega-cyanobutyl, etc. radicals. When the products of this invention are prepared from liquid silanol chain-stopped polydiorganosiloxanes containing silicon-bonded cyanoalkyl radicals, it is preferred that the nitrile group be attached to silicon through at least 2 carbon atoms. Preferably, no more than about 10 mole percent of the silicon atoms contain silicon-bonded cyanoalkyl radicals.

was charged a solution of 20 parts tetrahydrofuran... aminosilane described in Example 2 began. ...into this reaction mixture. Carbon dioxide was bubbled. The reaction mixture and immediate reaction action mixture carried the temperature of the reaction up to about 50° C. Carbon dioxide addition was continued until reaction had been completed as evidenced by the cooling of the reaction mixture. This resulted in a solution of the mixed tris-carbamate of Example 2 in tetrahydrofuran. A number of room temperature vulcanizing silicone rubber compositions were made by adding various amounts of this tetrahydrofuran solution of the mixed tris-carbamate to a silap... polydimethylsiloxane having the "...as..." poise at 25° C. and cont:

position comprising a liquid silanol chain-stopped polydiorganosiloxane having the formula:

$$HO[Y_2SiO]_nH$$

and an organosilyl tris-carbamate having the formula:

$$R Si(OCNR')_3$$

where Y and R are... consisting of...

corporating various fillers or extenders therein to change various properties. Such fillers or extenders can be used to vary the color of the material or to reduce the cost of the material. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clays, asbestos, carbon and graphite, as well as other organic materials such as cork, cotton and synthetic fibers.

When fillers are added to the compositions of the present invention, they are generally employed in amounts of from about 20 to 200 parts filler per 100 parts of the liquid silanol chain-stopped polydiorganosiloxane of Formula 3. The fillers are uniformly mixed with the polydiorganosiloxane and thereafter the organosilyl tris-carbamate is added by methods previously described and the reaction mixture is allowed to cure. The presence of fillers in the compositions of the present invention has no significant effect on the rate of cure of such compositions.

The room temperature curing silicone rubber compositions of the present invention are particularly adapted for caulking and sealing applications where adhesion to various surfaces is important. For example, the materials are useful in household caulking applications and industrial applications such as on buildings, factories, automotive equipment and where adhesion to masonry, glass, plastic, metal and wood is required.

The following examples are illustrative of the practice of my invention and are not intended for purposes of limitation. All parts are by weight.

*Example 1*

Into a reaction vessel was added 850 parts of dry toluene and 364 parts of isopropylamine. The reaction mixture was then cooled below room temperature and the addition of 149 parts methyltrichlorosilane was begun. The rate of addition was controlled so that the pot temperature never rose above 30° C. After the addition, the reaction vessel was slowly heated to a temperature of 67° C. at which refluxing began. Reflux was continued while the pot temperature rose to 105° C., after which the reaction mixture was allowed to cool overnight. An amine hydrochloride precipitate was removed and the filtrate was stripped of toluene and fractionally distilled to produce methyl tris-(isopropylamino)silane having the formula:

$$CH_3Si[NHCH(CH_3)_2]_3$$

which boiled at 196 to 200° C. at 1 atmosphere. The identity of the material was confirmed by infrared analysis. To a reaction vessel was added a solution of 68 parts of the above aminosilane in 60 parts toluene and dry carbon dioxide was passed through the solution and vented through a reflux condenser. The pot temperature was increased to 50° C. during the carbon dioxide addition and at this point, the exotherm produced by uptake of carbon dioxide in the reaction mixture was sufficiently high to maintain the reaction temperature. As the addition of carbon dioxide continued, an organo tris-carbamate having the formula:

$$(CH_3)Si[OCNHCH(CH_3)_2]_3$$

precipitated from the reaction mixture. This carbamate was a solid material which sublimed at a temperature of 60 to 90° C. and which was soluble in polar solvents, such as butyl acetate and dimethylformamide. When this triscarbamate is added to a 3,000 centipoise polydimethylsiloxane fluid which is chain-stopped with silanols and contains 0.3 weight percent silicon-bonded hydroxyl groups, with the tris-carbamate being present in amounts sufficient to provide 0.5 mole of the carbamate per mole of silicon bonded hydroxyl groups, the resulting material cures to a hard silicone rubber at room temperature in a time of about three hours. When the same reaction mixture is maintained at a temperature of 50° C. during curing, evolution of carbon dioxide during the curing is sufficiently fast so that a cured sponge product is formed in about one hour.

*Example 2*

To a reaction vessel was added a solution of 149 parts methyltrichlorosilane in 650 parts toluene. To this solution was added with stirring 202 parts of di-n-propylamine, 118 parts isopropylamine and 160 parts n-butylamine. This reaction mixture was heated for one hour at reflux and then allowed to cool overnight. During this time, a cake of amine hydrochloride had formed in the bottom of the reaction vessel and the liquid layer contained crystalline material. This liquid layer was decanted, the crystalline material was removed by filtration, the filtrate was stripped of toluene and unreacted amines and the residue was fractionally distilled to produce a methyltriaminosilane having the average formula:

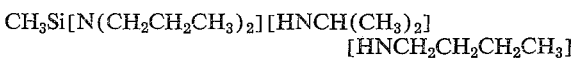

$$CH_3Si[N(CH_2CH_2CH_3)_2][HNCH(CH_3)_2]$$
$$[HNCH_2CH_2CH_2CH_3]$$

which silane had a boiling range of 140 to 200° C. at 55 mm. Hg. This aminosilane was actually a mixture of aminosilanes in which each silicon atom contained one methyl substituent and three silicon-bonded organoamino radicals. However, while the average distribution of the organoamino radicals is that shown by the above formula, the various silane molecules in the amine mixture actually contained a variety of substituents. For example, it is entirely possible that some of the aminosilanes are methyl tris-(n-butylamino)silanes while others were methyl tris-(n-propylamino)silanes. To a reaction vessel was added a solution of 50 parts of the mixed aminosilane and 100 parts xylene. The reaction mixture was heated to a temperature of 50° C. while carbon dioxide was introduced. Carbon dioxide uptake was sufficient to maintain the reaction temperature at 50 to 60° C. until absorption of carbon dioxide ceased. At this time, the reaction mixture was allowed to cool to room tempearture to form a waxy, solid material comprising a mixture of tris-carbamates having the average formula:

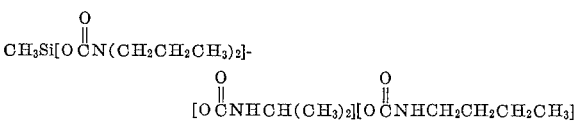

and the xylene solvent. This waxy material was used as a curing catalyst by adding this material to a silanol chain-stopped polydimethylsiloxane fluid having a viscosity of around 3,000 centipoise at 25° C. and containing 0.3 weight percent silicon-bonded hydroxyl groups in an amount sufficient to provide 2 moles of the tris-carbamate per mole of silicon-bonded hydroxyl groups. After thoroughly mixing the two components of this reaction mixture, the mixture cured to a tough silicone rubber after three hours at room temperature.

*Example 3*

A sponge rubber product was prepared by mixing the tris-carbamate of Example 2 into the silicone fluid of Example 2 in the same proportions employed in that example. However, in the present example, the waxy solid was first heated to a temperature of 55 C., at which point it became a liquid solution of the carbamate in xylene, and this warmed material was added to the silicone fluid which had previously been heated to a temperature of 135° C. The components were rapidly mixed and immediately carbon dioxide evolution caused the material to sponge at the same time the composition cured. The resulting product was a strong, flexible silicone rubber sponge.

Example 4

To a reaction vessel was charged a solution of 20 parts of the mixed aminosilane described in Example 2 in 100 parts tetrahydrofuran. Carbon dioxide was bubbled into this reaction mixture and immediate reaction began. The reaction carried the temperature of the reaction mixture up to about 50° C. Carbon dioxide addition was continued until reaction had been completed as evidenced by the cooling of the reaction mixture. This resulted in a solution of the mixed tris-carbamate of Example 2 in tetrahydrofuran. A number of room temperature vulcanizing silicone rubber compositions were made by adding various amounts of this tetrahydrofuran solution of the mixed tris-carbamate to a silanol chain-stopped polydimethylsiloxane having the viscosity of 3,000 centipoise at 25° C. and containing 0.3 weight percent silicon-bonded hydroxyl groups. More particularly, compositions were made which contained 0.25, 0.33, 0.66, 1.0, 2.0 and 4.0 moles of the mixed silyl tris-carbamate per mole of silicon-bonded hydroxyl groups in the polydimethylsiloxane. In each case, the mixture cured to a silicone rubber at room temperature in a time of from two to four hours. It was noted that the materials prepared with 1.0 mole or more of the silyl tris-carbamate per mole of silicon-bonded hydroxyl groups were harder rubbers than those prepared with less than 1.0 mole. A portion of the solution of the silyl tris-carbamate was added in an amount sufficient to provide 1.0 mole of silyl tris-carbamate per mole of silicon-bonded hydroxyl groups in the polydimethylsiloxane described above but with the polydimethylsiloxane heated to a temperature of 70° C. This mixture cured to a low density silicone rubber sponge within about one hour.

Example 5

To a reaction vessel is added 210 parts of phenyltrichlorosilane in 900 parts benzene. Methylamine is bubbled into the stirred reaction mixture to form phenyl tris-(methylamino)silane. An amine hydrochloride precipitate is removed, benzene is stripped from the filtrate and the aminosilane is isolated from the residue by fractional distillation. Carbon dioxide is then bubbled into a solution of 100 parts of the aminosilane in 500 parts tetrahydrofuran until the theoretical amount of carbon dioxide is absorbed. This results in a tetrahydrofuran solution of a tris-carbamate having the formula:

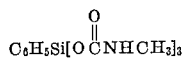

This solution is added to the silanol-stopped polydimethylsiloxane fluid of Example 1 at a temperature of 50° C. in an amount sufficient to provide 1.0 mole of the tris-carbamate per mole of silicon-bonded hydroxyl groups in the polydimethylsiloxane fluid. Evolution of methyl amine and carbon dioxide begins immediately. The material cures within one-half hour to a silicone rubber sponge.

While the foregoing examples have illustrated a number of embodiments of my invention, it should be understood that my invention is applicable to organopolysiloxanes which are convertible to the cured, solid, elastic state which comprise an organosilyl tris-carbamate within the scope of Formula 1 and a liquid silanol chain-stopped polydiorganosiloxane within the scope of Formula 3. These compositions are prepared by mixing the organosilyl tris-carbamate with the silanol chain-stopped polydiorganosiloxane.

What I claim as new and desire to secure by Letters Patent of the United States is:

1. A room temperature curing organopolysiloxane composition comprising a liquid silanol chain-stopped polydiorganosiloxane having the formula:

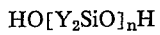

and an organosilyl tris-carbamate having the formula:

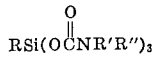

where Y and R are members selected from the class consisting of monovalent hydrocarbon radicals, halogenated monovalent hydrocarbon radicals and cyanoalkyl radicals, R' is a member selected from the class consisting of hydrogen and lower alkyl radicals and R" is a lower alkyl radical and $n$ has a value of at least 10, said organosilyl tris-carbamate being present in an amount equal to from 0.25 to 5 moles per mole of silicon-bonded hydroxyl groups in said polydiorganosiloxane.

2. A composition curable to the solid, cured, elastic state comprising a liquid silanol chain-stopped polydimethylsiloxane having a viscosity of from about 100 to 50,000 centipoises when measured at 25° C. and an organosilyl tris-carbamate having the formula:

where R is a member selected from the class consisting of monovalent hydrocarbon radicals, halogenated monovalent hydrocarbon radicals and cyanoalkyl radicals, R' is a member selected from the class consisting of hydrogen and lower alkyl radicals and R" is a lower alkyl radical, said organosilyl tris-carbamate being present in an amount equal to from 0.25 to 5 moles per mole of silicon-bonded hydroxyl groups in said polydimethylsiloxane.

3. The process for forming a composition curable to the solid, elastic state which comprises adding an organosilyl tris-carbamate having the formula:

to a liquid silanol chain-stopped polydiorganosiloxane having the formula:

where R and Y are members selected from the class consisting of monovalent hydrocarbon radicals, halogenated monovalent hydrocarbon radicals and cyanoalkyl radicals, R' is a member selected from the class consisting of hydrogen and lower alkyl radicals, R" is a lower alkyl radical and $n$ is an integer equal to at least 10, said organosilyl tris-carbamate being present in an amount equal to from 0.25 to 5 moles per mole of silicon-bonded hydroxyl groups in said polydiorganosiloxane.

References Cited by the Examiner

UNITED STATES PATENTS

| | | | |
|---|---|---|---|
| 3,035,016 | 5/1962 | Bruner | 260—46.5 |
| 3,061,575 | 10/1962 | Russell | 260—46.5 |
| 3,133,891 | 5/1964 | Ceyzeriat | 260—46.5 |

FOREIGN PATENTS

| | | |
|---|---|---|
| 851,578 | 10/1960 | Great Britain. |
| 931,699 | 7/1963 | Great Britain. |
| 1,198,749 | 12/1959 | France. |

OTHER REFERENCES

Racueil des Travaux Chimiques des Pays, Bas, vol. 81, March 1962, pp. 276–278.

DONALD E. CZAJA, *Primary Examiner.*

LEON J. BERCOVITZ, *Examiner.*

F. McKELVEY, *Assistant Examiner.*